(12) United States Patent
Pikesh et al.

(10) Patent No.: US 9,549,505 B1
(45) Date of Patent: Jan. 24, 2017

(54) AGRICULTURAL VEHICLE CONVEYANCE LINKAGE

(71) Applicant: Deere & Company, Moline, IL (US)

(72) Inventors: Derryn W. Pikesh, Geneseo, IL (US); Dale H. Killen, Port Byron, IL (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 14/859,692

(22) Filed: Sep. 21, 2015

(51) Int. Cl.
*B60P 1/34* (2006.01)
*B65G 21/10* (2006.01)
*A01D 90/10* (2006.01)
*B65G 41/00* (2006.01)

(52) U.S. Cl.
CPC ............. *A01D 90/10* (2013.01); *B65G 41/002* (2013.01); *B65G 41/008* (2013.01)

(58) Field of Classification Search
CPC .................................. B60P 1/34; B65G 21/10
USPC ............................. 198/312, 313, 315, 316.1
See application file for complete search history.

(56) References Cited

U.S. PATENT DOCUMENTS

| | | | | |
|---|---|---|---|---|
| 3,269,563 A * | 8/1966 | Spinrad | ............. | A41H 43/0207 223/37 |
| 3,592,331 A * | 7/1971 | Morgan | ............... | A01D 46/243 198/632 |
| 4,684,314 A * | 8/1987 | Luth | ........................ | B60P 1/025 104/45 |
| 5,009,548 A * | 4/1991 | Falbo | ........................ | E02F 5/10 198/314 |
| 5,044,484 A * | 9/1991 | Douglas | ............... | B65G 41/002 198/313 |
| 5,165,838 A * | 11/1992 | Kallansrude | ....... | B60G 17/0152 198/782 |
| 5,333,725 A * | 8/1994 | Douglas | ............... | B65G 41/002 198/632 |
| 5,443,351 A * | 8/1995 | Pettijohn | ................... | B60P 1/36 198/632 |
| 5,529,455 A * | 6/1996 | Kaster | ................... | A01C 15/003 198/317 |
| 5,819,950 A * | 10/1998 | McCloskey | ............. | B07B 1/005 198/313 |
| 6,152,248 A * | 11/2000 | Hidaka | ................ | B62D 11/183 180/6.36 |
| 6,497,546 B2 * | 12/2002 | Wood | ........................ | B60P 1/42 198/536 |
| 7,261,200 B1 * | 8/2007 | Kemper | ................. | A01D 17/00 198/581 |

(Continued)

*Primary Examiner* — Douglas Hess
(74) *Attorney, Agent, or Firm* — Christopher J. Volkmann; Kelly, Holt & Christenson PLLC

(57) ABSTRACT

In one example, a conveyance system comprises a conveyance mechanism and a linkage configured to movably couple the conveyance mechanism to a vehicle, wherein the conveyance mechanism is coupled to the linkage at a first connection mechanism and configured to pivot about a pivot point. The conveyance system comprises a vertical movement mechanism configured to move the first connection mechanism in a substantially vertical direction, and a tilt movement mechanism comprising a tilt actuator configured to pivot the conveyance mechanism about the pivot point. A second connection mechanism couples the tilt actuator to one of the conveyance mechanism or the linkage and allows a defined range of tilt movement of the conveyance mechanism that is independent of actuation of the tilt actuator.

20 Claims, 6 Drawing Sheets

(56) References Cited

U.S. PATENT DOCUMENTS

| | | | | |
|---|---|---|---|---|
| 7,347,311 | B2 * | 3/2008 | Rudge | B65G 21/14 |
| | | | | 198/313 |
| 7,552,818 | B2 * | 6/2009 | Makinen | B65G 41/002 |
| | | | | 198/861.2 |
| 8,336,638 | B2 * | 12/2012 | Brouwer | A01B 45/045 |
| | | | | 172/20 |
| 8,714,344 | B2 | 5/2014 | Kowalchuk et al. | |
| 8,801,353 | B2 | 8/2014 | Friggstad et al. | |
| 8,881,887 | B2 * | 11/2014 | Jorgensen | B65G 21/10 |
| | | | | 198/313 |

* cited by examiner

AGRICULTURAL VEHICLE CONVEYANCE LINKAGE

FIELD OF THE DESCRIPTION

The present disclosure generally relates to conveyance systems on agricultural vehicles. More specifically, but not by limitation, the present disclosure relates to a deployment mechanism for an agricultural vehicle conveyance system.

BACKGROUND

An agriculture commodity cart, or any other agricultural or other vehicle, includes one or more tanks that carry a commodity or agricultural product, such as seed and/or fertilizer. An agricultural commodity cart also has a conveyor mounted somewhere along the cart for transferring agricultural product, for example, between transport vehicles and storage vessels. It can be more convenient to mount a conveyor on the cart directly, rather than on a transport vehicle or maneuvering a portable conveyor as a separate implement.

A conveyor is typically installed with a deployment mechanism that allows it to be moved from a transport position to an operating position. The deployment mechanism also allows the conveyor to be maneuvered so that a spout or an upper discharge end of the conveyor can be maneuvered to direct the product from the conveyor into a receiving vessel (e.g., a tank on the cart, a storage tank, etc.). Such conveyors commonly include a hopper at an intake end.

The discussion above is merely provided for general background information and is not intended to be used as an aid in determining the scope of the claimed subject matter.

SUMMARY

In one example, a conveyance system comprises a conveyance mechanism and a linkage configured to movably couple the conveyance mechanism to a vehicle, wherein the conveyance mechanism is coupled to the linkage at a first connection mechanism and configured to pivot about a pivot point. The conveyance system comprises a vertical movement mechanism configured to move the first connection mechanism in a substantially vertical direction, and a tilt movement mechanism comprising a tilt actuator configured to pivot the conveyance mechanism about the pivot point. A second connection mechanism couples the tilt actuator to one of the conveyance mechanism or the linkage and allows a defined range of tilt movement of the conveyance mechanism that is independent of actuation of the tilt actuator.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Many agricultural vehicles are equipped with conveyance systems. One example conveyance system comprises a conveyance mechanism configured to convey a product (e.g., seed and/or fertilizer) from a product source into a receiving vessel (e.g., a tank on the vehicle, a separate storage tank, etc.). In one example, a conveyance mechanism comprises a conveyor (or auger or other similar mechanism) for conveying the product in a conveyance path. In one example, the conveyor comprises a flat conveyor belt, a vibration assisted conveyor belt, a hydraulic conveyor, a cleated conveyor belt, and/or other type of conveyor. The conveyance mechanism comprises, in one example, a spout at a discharge end and a hopper at an input end.

The conveyance system can include a deployment mechanism that movably supports the conveyance mechanism on the vehicle and is configured to move the conveyance mechanism between a storage position to a deployed position. In one example, the deployment mechanism includes a support arm or other linkage that is coupled to the vehicle and the conveyance mechanism. The linkage is movable with respect to the vehicle using one or more actuators, such as linear hydraulic actuators, or other types of actuator.

In many operational settings, moving the conveyance mechanism between the storage and deployed positions can be difficult. For example, the movement often requires precise control to avoid contact with structures or other obstacles around the vehicle. For instance, in one example operation the tank on the agricultural vehicle is filled with seed from a source vehicle, such as a semi-trailer or other similar vehicle that has a lower discharge opening. A hopper of the conveyance mechanism is placed below this opening to load the seed into the tank on the agricultural vehicle. However, due to the considerable length of the conveyance mechanism, it is often difficult to maneuver the hopper into the position with contacting the vehicle, which could result in damage to the vehicle and/or conveyance mechanism. For instance, in one example deployment mechanism configuration, the conveyance mechanism can be tilted into a suitable incline angle and then rotated about a vertical axis using a swivel to place the hopper under the vehicle. However, this movement is difficult without striking the source vehicle (e.g., wheels or other portions) or the agricultural vehicle. Further, the movement must be repeated if a second source vehicle is required to be moved into place.

Figure 1:
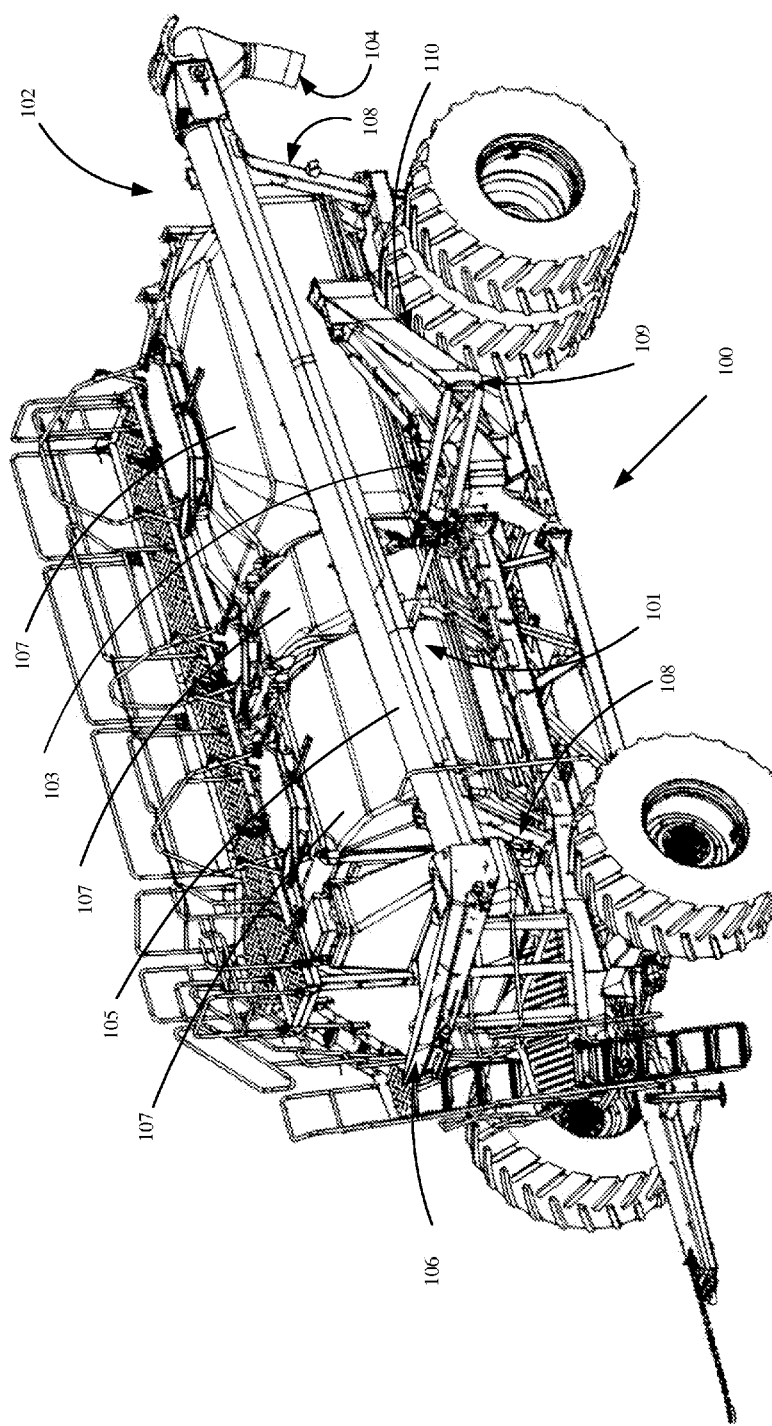
FIG. 1 illustrates an agricultural vehicle with a conveyance mechanism, in one example.

FIG. 1 illustrates an example agricultural vehicle 100 with a conveyance system 101. Conveyance system 101 includes a conveyance mechanism 102 that is movably supported on vehicle 100 by a deployment mechanism 103. Conveyance mechanism 102 includes a discharge 104, an elongated housing 105 (e.g., a tube or other conduit), and a hopper 106. Mechanism 102 includes a conveyor, auger, or other mechanism (not shown in FIG. 1) disposed in housing 105 for conveying material from hopper 106 to discharge 104. Hopper 106 forms an input to conveyance mechanism 102 and discharge 104 comprises, in one example, a spout for releasing the material conveyed through housing 105.

Vehicle 100 includes one or more storage containers 107 configured to store material. For example, vehicle 100 can comprise an air seeder having a air-driven distribution system for distributing seed and/or fertilizer from container(s) 107 to a unit having ground engaging openers.

Conveyance mechanism 102 is shown in FIG. 1 in a storage position. Vehicle 100 illustratively includes a storage mechanism 108 (e.g., one or more storage ledges or other structure) that supports conveyance mechanism in a substantially horizontal position. Deployment mechanism 103 includes a linkage 109 (illustratively one or more support arms 110) for moving the conveyance mechanism 102 from the storage position to a deployed position. As discussed in further detail below, deployment mechanism 103 is configured to move conveyance mechanism 102 in a substantially horizontal direction outwardly from vehicle 100, to move conveyance mechanism 102 in a substantially vertical direction, and to change an incline angle of conveyance mechanism 102 by tilting about a pivot point.

Figure 2:
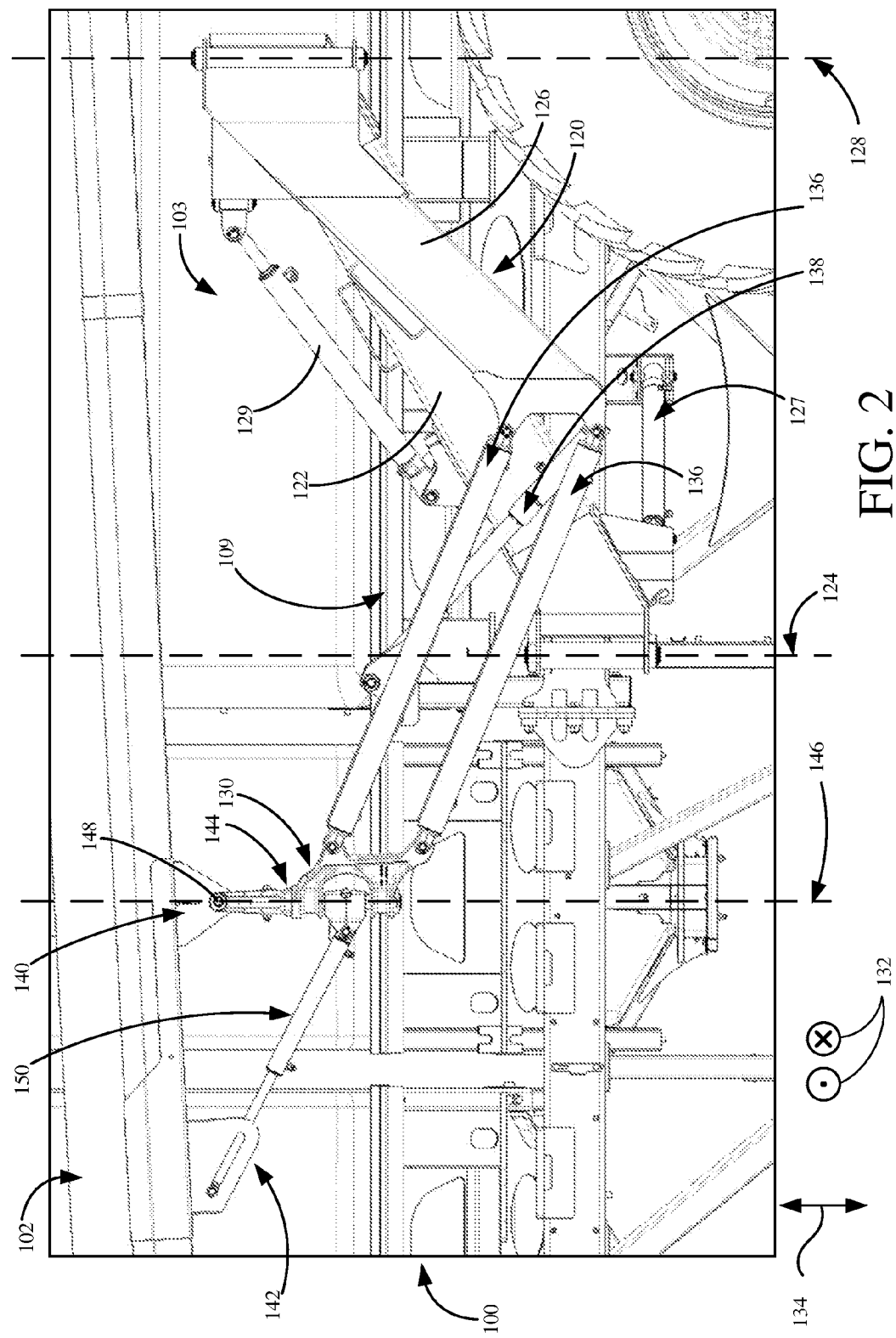
FIG. 2 is an enlarged view illustrating a deployment mechanism, in one example.

FIG. 2 is an enlarged view illustrating deployment mechanism 103 in further detail. As shown, linkage 109 includes a support arm assembly 120 having a plurality of support arms, and a conveyor connection assembly 130 that movably couples conveyance mechanism 102 on linkage 109.

Support arm assembly 120 includes a first support arm 122 coupled to vehicle 100 and configured to pivot with respect to vehicle 100 about a vertical axis 124. A second support arm 126 is coupled to support arm 122 and configured to pivot with respect to support arm 122 about a vertical axis 128. A horizontal movement mechanism comprises at least one actuator, such as a linear hydraulic actuator or cylinder, or other type of actuator. The horizontal movement mechanism, in one example, is coupled to support arm assembly 120 and configured to move support arms 122 and 126 such that linkage 109 pivots about axes 128 and/or 128 and assembly 130 moves outwardly from vehicle in a substantially horizontal direction (generally represented by arrows 132). In the illustrated example, a first actuator 127 is configured to move arm 122 relative to vehicle 100 (about axis 124) and a second actuator 129 is configured to move arm 126 relative to 122 (about axis 128).

A vertical movement mechanism is configured to move linkage 109 such that connection assembly 130 moves in a substantially vertical direction (generally represented by double arrow 134). In the illustrated example, linkage 109 comprises one or more support bars 136 that are each pivotably coupled to arm 126 at a first end and pivotably coupled to connection assembly 130 at a second end. In one example, support bars 136 comprise at least three substantially parallel support bars. In one example, support bars 136 comprise at least four substantially parallel support bars. A four bar configuration can provide increased torsional resistance to undesired movement of connection assembly 130.

The vertical movement mechanism also comprises at least one actuator 138, such as a linear hydraulic actuator or cylinder, or other type of actuator. A first end of actuator 138 is pivotably coupled to arm 126, or other portion of linkage 109, and a second end of actuator 138 is pivotably coupled to at least one support bar 136, or other portion of linkage 109. Actuation of actuator 138 changes the inclination angle of support bar(s) 136, by pivoting support bar(s) 136 with respect to arm 126 and connection assembly 130, thus causing connection assembly 130 to move up or down in direction 134.

Conveyor connection assembly 130 illustratively comprises a first connection mechanism 140, a second connection mechanism 142, and a swivel 144 configured to pivot connection mechanism 140, and thus conveyance mechanism 102, about a substantially vertical axis 146. Connection mechanism 140 is coupled to conveyance mechanism 102 and configured to pivot about a pivot point 148. A tilt movement mechanism is configured to pivot conveyance mechanism 102 about pivot point 148. In one example, connection mechanism 142 couples the tilt movement mechanism to conveyance mechanism 102, and includes a tilt actuator 150, such as a linear hydraulic actuator or cylinder, or other type of actuator.

Figure 3:
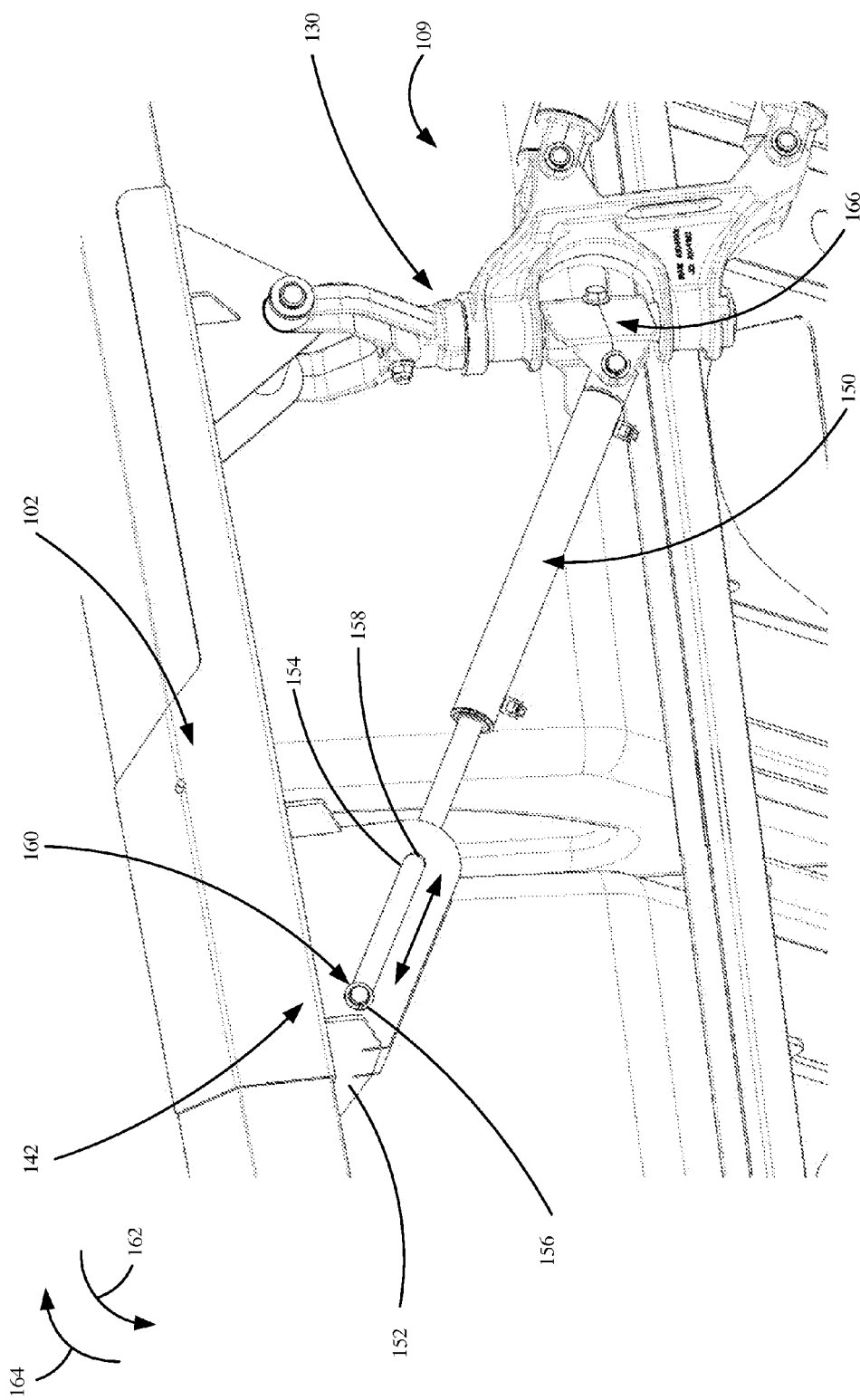
FIG. 3 illustrates one example of a connection mechanism that couples a tilt actuator to a conveyance mechanism.

FIG. 3 illustrates one example of connection mechanism 142 that couples tilt actuator 150 to conveyance mechanism 102. As discussed in further detail below, connection mechanism 142 allows a defined range of tilt movement of conveyance mechanism 102 that is independent of actuation of tilt actuator 150. Before discussing this movement in further detail, examples of connection mechanism 142 will be described.

In the example illustrated in FIG. 3, connection mechanism 142 includes a pair of spaced apart plates 152 (only one plate can be seen in FIG. 3), each having an aperture 154 formed therein. Aperture 154 illustratively comprises an elongate slot (also referred to as slot 154) having a first end 156 and a second end 158. A portion, illustratively a transversely oriented attachment pin 160, of actuator 150 is supported and movable within slot 154. When actuator 150 is actuated with pin 160 located in a middle portion of slot 154, pin 160 moves toward one of ends 156 or 158 without resulting in tilting movement of conveyance mechanism 102. However, once pin 160 reaches end 156 as actuator 150 is being extended, conveyance mechanism 102 is tilted in a first direction 162 which reduces the inclination angle of mechanism 102. Similarly, once pin 160 reaches end 158 as actuator 150 is being retracted, conveyance mechanism 102 is tilted in a second direction 164 which increases the inclination angle of mechanism 102. In other words, movement of pin 160 between ends 156 and 158 allows passive tilting movement of conveyance mechanism 102 which is independent of actuation of tilt actuator 150. The length of slot 154 defines this range of tilt movement. As such, a longer slot 154 allows a greater range of independent, passive movement, and short slot 154 allows a short range of independent, passive movement.

Figure 4A:
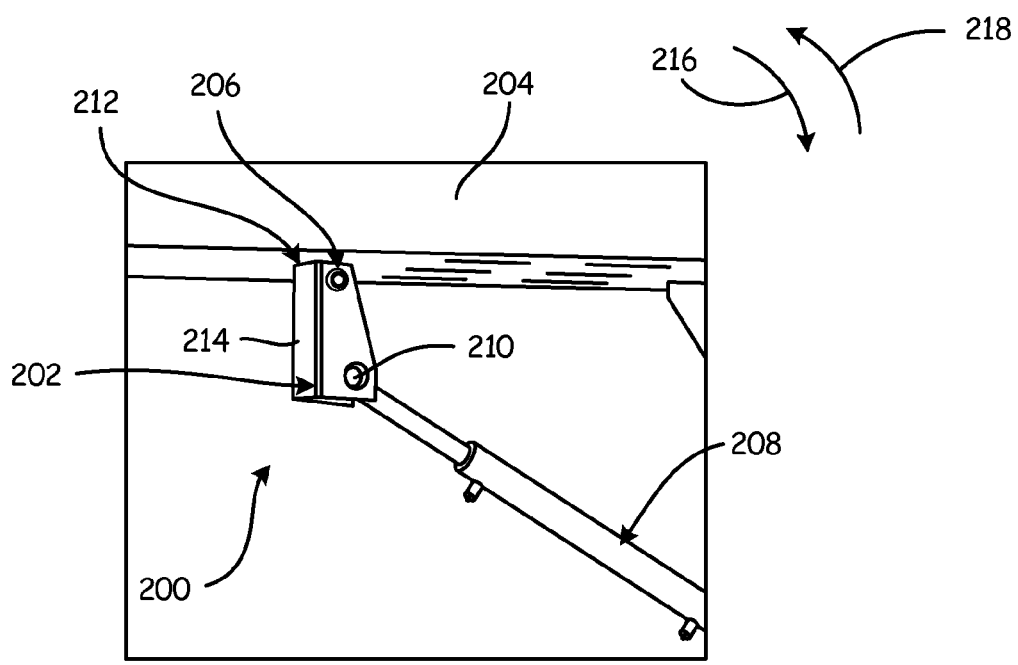
FIGS. 4A and 4B illustrate one example of a connection mechanism that couples a tilt actuator to a conveyance mechanism.
Figure 4B:
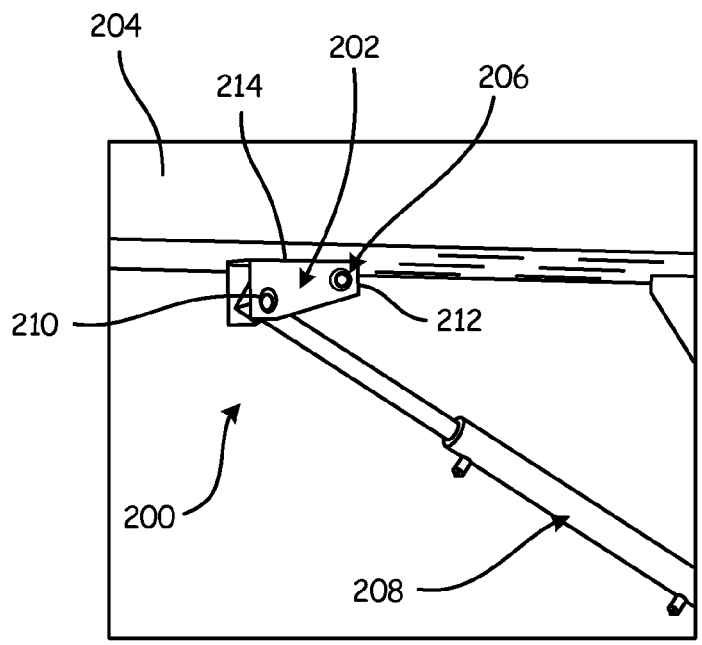

FIGS. 4A and 4B (collectively referred to as FIG. 4) illustrate another example of a connection mechanism 200 that couples a tilt actuator to a conveyance mechanism and allows a defined range of tilt movement of the conveyance mechanism that is independent of actuation of the tilt actuator.

Connection mechanism 200 comprises a toggle having a body 202 that is pivotably coupled to a conveyance mechanism 204 at a first pivot point 206. Body 202 is also pivotably coupled to a tilt actuator 208 at a second pivot point 210. As body 202 rotates with respect to mechanism 204, about pivot point 206, a first end 212 of body 202 remains proximate mechanism 204. As actuator 208 is actuated to extend its length, body 202 is rotated (clockwise in the view of FIG. 4) until a surface 214 contacts mechanism 204. Then, mechanism 204 is tilted in a first direction 216 which reduces the inclination angle of mechanism 204. Similarly, as actuator 208 is actuated to reduce its length, body 202 is rotated (counter clockwise in the view of FIG. 4) until end 212 contacts mechanism 204. Then, mechanism 204 is tilted in a second direction 218 which increase the inclination angle of mechanism 204. Connection mechanism 200 allows passive tilting movement of conveyance mechanism 204 which is independent of actuation of tilt actuator

208. That is, body 202 can be moved between the positions of FIGS. 4A and 4B without actuation of actuator 208.

It is noted that FIGS. 3 and 4 illustrate two particular examples of connection mechanisms that allow a defined range of tilt movement of a conveyance mechanism that is independent of actuation of a tilt actuator. Other configurations can be utilized. Further, it is also noted that the connection mechanism can be coupled to an opposite end of the tilt actuator (i.e., that is opposite the conveyance mechanism). To illustrate, connection mechanism 142 is shown in FIG. 3 as coupling actuator 150 to conveyance mechanism 102. In one example, mechanism 142 couples actuator 150 to linkage 109. For instance, a second attachment pin 166 of actuator 150 can be positioned within a slot formed within connection assembly 130 that functions in a manner substantially similar to slot 154.

FIGS. 5A-5D (collectively referred to as FIG. 5) comprise schematic diagrams illustrating a motion sequence of a conveyance system, in one example. For sake of illustration, but not by limitation, FIG. 5 will be described in the context of deployment mechanism 103 illustrated in FIG. 2.

In the example of FIG. 5, the conveyance system is utilized to load storage container 107 with product from a product source, such as a semi-trailer or other transport vehicle. Conveyance mechanism 102 is illustrated in FIG. 5A in a deployed position in which hopper 106 is located below a lower opening of source 300 and the discharge end 104 is located over an upper opening of container 107. In some instances, when material source 300 is empty and is to be replaced with a new material source (e.g., a second semi-trailer or other transport vehicle), conveyance mechanism 102 must be moved from under material source 300. For example, in the case of a semi-trailer or similar vehicle, wheels are located on both sides of hopper 106. Accordingly, conveyance mechanism 102 is configured to move to a retracted position, to allow the material source 300 to be moved. However, rather than requiring conveyance mechanism 102 to be swiveled about a vertical axis, thereby swinging hopper 106 away from the source 300 (which can result in hopper 106 or other portions of the conveyance system striking source 300), in the example of FIG. 5 conveyance mechanism 102 is moved to the retracted position shown in FIG. 5D, which results in a substantially lateral movement of hopper 106 away from source 300. FIGS. 5B and 5C illustrate transitional positions between FIG. 5A and FIG. 5D.

In the illustrated example, the movement from FIGS. 5A to 5D is performed by moving connection assembly 130 in a vertical direction. In one example, this comprises only actuating actuators (either manually, automatically, or semi-automatically) that move connection assembly 130 in the vertical position. That is, actuation of horizontal movement actuator(s) and tilt movement actuator(s) is not required. Rather, passive tilting movement of conveyance mechanism 102 results from the range of tilt movement that is allowed by the connection mechanism relative to the tilt actuator.

To illustrate, in the example of FIG. 3, as connection assembly 130 is raised vertically using only the vertical movement actuator(s), the weight of hopper 106 causes hopper 104 to remain along the ground. As connection assembly 130 is raised, the attachment pin 160 of actuator 150 slides within slot 154 to the end 156. This is illustrated by the progression shown in FIGS. 5B, 5C, and 5D. The incline angle 302 is greater in FIG. 5D than in FIG. 5A. However, in this example, this is achieved by only controlling the vertical movement mechanisms of the conveyance system. Similarly, as connection assembly 130 is lowered vertically using only the vertical movement actuator(s), hopper 106 slides along the ground to return to the position shown in FIG. 5A. As connection assembly 130 is lowered, the attachment pin 160 of actuator 150 slides within slot 154 to the end 158.

Figure 5A:
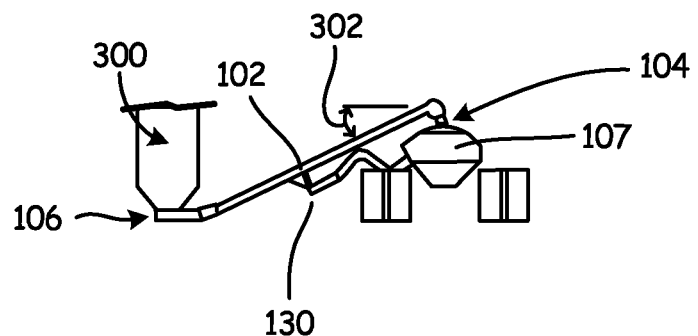
FIGS. 5A-5D illustrate a motion sequence of a conveyance mechanism, in one example.
Figure 5B:
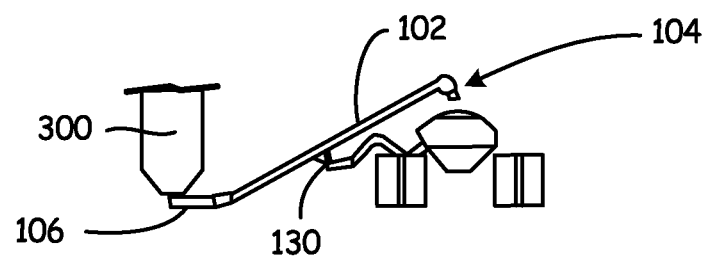
Figure 5C:
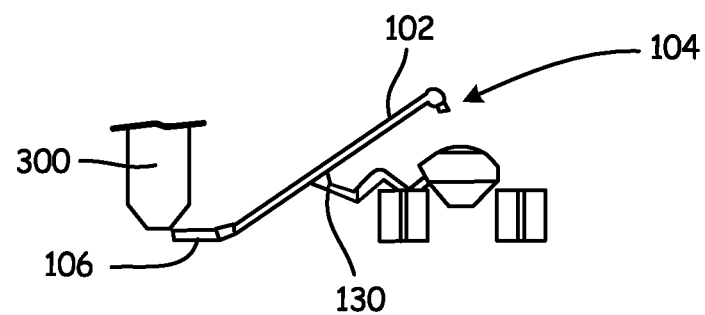
Figure 5D:
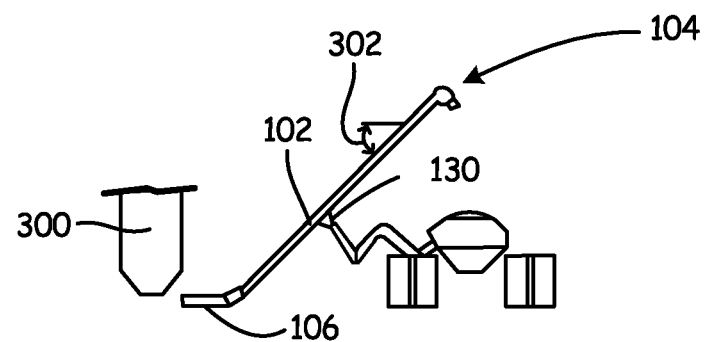

Because hopper 106 is moved laterally along the ground, as shown in FIGS. 5A-5D, the hopper 106 and other portions of conveyance mechanism 102 avoid contact with source 300. In one example, the lateral distance of hopper 106 between the deployed position of FIG. 5A and the retracted position of FIG. 5D is at least 2 feet. In another example, the lateral distance is at least 3 feet. In another example, the lateral distance is at least 4 feet. These, of course, are by way of example only.

The configuration of the conveyance system represented in FIG. 5 allows for an efficient, ergonomic control of the conveyance system. For example, a user is only required to operate the vertical movement mechanism(s) to perform the movement shown in FIG. 5. Separate control of horizontal movement mechanism(s) and/or tilting movement mechanism(s) of conveyance mechanism 102, which can be cumbersome and error prone, is avoided in this example.

It should also be noted that the different examples described herein can be combined in different ways. That is, parts of one or more examples can be combined with parts of one or more other examples. All of this is contemplated herein.

Example 1 is a conveyance system comprising a conveyance mechanism, a linkage configured to movably couple the conveyance mechanism to a vehicle, wherein the conveyance mechanism is coupled to the linkage at a first connection mechanism and configured to pivot about a pivot point, a vertical movement mechanism configured to move the first connection mechanism in a substantially vertical direction, and a tilt movement mechanism comprising a tilt actuator configured to pivot the conveyance mechanism about the pivot point, wherein a second connection mechanism couples the tilt actuator to one of the conveyance mechanism or the linkage and allows a defined range of tilt movement of the conveyance mechanism that is independent of actuation of the tilt actuator.

Example 2 is the conveyance system of any or all previous examples, wherein the tilt actuator comprises a linear hydraulic cylinder that is actuatable to change an incline angle of the conveyance mechanism.

Example 3 is the conveyance system of any or all previous examples, wherein the second connection mechanism comprises an aperture, and a portion of the tilt actuator is received and moveable within the aperture.

Example 4 is the conveyance system of any or all previous examples, wherein the aperture comprises a slot and the portion of the tilt actuator comprises an attachment pin that is moveable between ends of the slot.

Example 5 is the conveyance system of any or all previous examples, wherein the second connection mechanism is coupled to the conveyance mechanism at a location that is spaced from the first connection mechanism.

Example 6 is the conveyance system of any or all previous examples, wherein the second connection mechanism comprises a toggle.

Example 7 is the conveyance system of any or all previous examples, wherein the toggle comprises a toggle body that is coupled to the tilt actuator and pivots about a pivot point.

Example 8 is the conveyance system of any or all previous examples, wherein the toggle body is pivotably coupled to the conveyance mechanism.

Example 9 is the conveyance system of any or all previous examples, wherein the conveyance mechanism comprises one of a conveyor or an auger.

Example 10 is the conveyance system of any or all previous examples, wherein the conveyance mechanism automatically tilts within the defined range of tilt movement in response to movement of the first connection mechanism in the substantially vertical direction, without actuation of the tilt actuator.

Example 11 is the conveyance system of any or all previous examples, wherein, during the movement of the first connection mechanism in the substantially vertical direction, an inlet end of the conveyance mechanism moves in a substantially horizontal direction along a support surface on which the vehicle is positioned.

Example 12 is the conveyance system of any or all previous examples, wherein the support surface comprises the ground and the inlet end of the conveyance mechanism comprises a hopper that remains in contact with the ground as the hopper moves in the substantially horizontal direction.

Example 13 is the conveyance system of any or all previous examples and further comprising, a storage mechanism configured to support the conveyance mechanism in a storage position.

Example 14 is the conveyance system of any or all previous examples, wherein the linkage comprises a plurality of support bars coupled to the first connection mechanism.

Example 15 is the conveyance system of any or all previous examples, wherein the vertical movement mechanism is coupled to at least one of the support bars.

Example 16 is the conveyance system of any or all previous examples, wherein the plurality of support bars comprises at least three substantially parallel support bars.

Example 17 is the conveyance system of any or all previous examples, further comprising a horizontal movement mechanism configured to move the first connection mechanism outward from the vehicle in a substantially horizontal direction, wherein the first connection mechanism comprises a swivel that allows rotation of the conveyance mechanism about a substantially vertical axis.

Example 18 is a deployment system configured to move a conveyance mechanism between a storage position and a deployed position, the deployment system comprising a linkage configured to movably couple the conveyance mechanism to a vehicle, wherein the linkage comprises a first connection mechanism configured to couple the conveyance mechanism to the linkage, and at least three substantially parallel support bars that movably support the first connection mechanism, a horizontal movement mechanism configured to move the first connection mechanism in a substantially horizontal direction, a vertical movement mechanism configured to move the first connection mechanism in a substantially vertical direction, and a tilt movement mechanism configured to tilt the conveyance mechanism.

Example 19 is the deployment system of any or all previous examples, wherein the vertical movement mechanism comprises a linear actuator that is operably coupled to at least one of the support bars.

Example 20 is a movement system for a conveyance mechanism, the system comprising a linkage configured to movably couple the conveyance mechanism to a vehicle, wherein the conveyance mechanism is coupled to the linkage at a first connection mechanism, a horizontal movement mechanism configured to move the first connection mechanism outward from the vehicle in a substantially horizontal direction, a vertical movement mechanism configured to move the first connection mechanism in a substantially vertical direction, a tilt actuator, and a second connection mechanism that couples the tilt actuator to one of the conveyance mechanism or the linkage, the second connection mechanism comprising a slot having a first end and a second end, wherein a portion of the tilt actuator is received and moveable between the first end and the second end of the slot.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A conveyance system comprising:
   a conveyance mechanism;
   a linkage configured to movably couple the conveyance mechanism to a vehicle, wherein the conveyance mechanism is coupled to the linkage at a first connection mechanism and configured to pivot about a pivot point;
   a vertical movement mechanism configured to move the first connection mechanism in a substantially vertical direction; and
   a tilt movement mechanism comprising a tilt actuator configured to pivot the conveyance mechanism about the pivot point, wherein a second connection mechanism couples the tilt actuator to one of the conveyance mechanism or the linkage and allows a defined range of tilt movement of the conveyance mechanism that is independent of actuation of the tilt actuator.

2. The conveyance system of claim 1, wherein the tilt actuator comprises a linear hydraulic cylinder that is actuatable to change an incline angle of the conveyance mechanism.

3. The conveyance system of claim 1, wherein the second connection mechanism comprises an aperture, and a portion of the tilt actuator is received and moveable within the aperture.

4. The conveyance system of claim 3, wherein the aperture comprises a slot and the portion of the tilt actuator comprises an attachment pin that is moveable between ends of the slot.

5. The conveyance system of claim 4, wherein the second connection mechanism is coupled to the conveyance mechanism at a location that is spaced from the first connection mechanism.

6. The conveyance system of claim 1, wherein the second connection mechanism comprises a toggle.

7. The conveyance system of claim 6, wherein the toggle comprises a toggle body that is coupled to the tilt actuator and pivots about a pivot point.

8. The conveyance system of claim 7, wherein the toggle body is pivotably coupled to the conveyance mechanism.

9. The conveyance system of claim 1, wherein the conveyance mechanism comprises one of a conveyor or an auger.

10. The conveyance system of claim 1, wherein the conveyance mechanism automatically tilts within the defined range of tilt movement in response to movement of the first connection mechanism in the substantially vertical direction, without actuation of the tilt actuator.

11. The conveyance system of claim 10, wherein, during the movement of the first connection mechanism in the substantially vertical direction, an inlet end of the conveyance mechanism moves in a substantially horizontal direction along a support surface on which the vehicle is positioned.

12. The conveyance system of claim 11, wherein the support surface comprises the ground and the inlet end of the conveyance mechanism comprises a hopper that remains in contact with the ground as the hopper moves in the substantially horizontal direction.

13. The conveyance system of claim 1, and further comprising:
a storage mechanism configured to support the conveyance mechanism in a storage position.

14. The conveyance system of claim 1, wherein the linkage comprises a plurality of support bars coupled to the first connection mechanism.

15. The conveyance system of claim 14, wherein the vertical movement mechanism is coupled to at least one of the support bars.

16. The conveyance system of claim 14, wherein the plurality of support bars comprises at least three substantially parallel support bars.

17. The conveyance system of claim 1, and further comprising:
a horizontal movement mechanism configured to move the first connection mechanism outward from the vehicle in a substantially horizontal direction, wherein the first connection mechanism comprises a swivel that allows rotation of the conveyance mechanism about a substantially vertical axis.

18. A deployment system configured to move a conveyance mechanism between a storage position and a deployed position, the deployment system comprising:
a linkage configured to movably couple the conveyance mechanism to a vehicle, wherein the linkage comprises a first connection mechanism configured to couple the conveyance mechanism to the linkage, and at least three substantially parallel support bars that movably support the first connection mechanism;
a horizontal movement mechanism configured to move the first connection mechanism in a substantially horizontal direction;
a vertical movement mechanism configured to move the first connection mechanism in a substantially vertical direction; and
a tilt movement mechanism configured to tilt the conveyance mechanism.

19. The deployment system of claim 18, wherein the vertical movement mechanism comprises a linear actuator that is operably coupled to at least one of the support bars.

20. A movement system for a conveyance mechanism, the system comprising:
a linkage configured to movably couple the conveyance mechanism to a vehicle, wherein the conveyance mechanism is coupled to the linkage at a first connection mechanism;
a horizontal movement mechanism configured to move the first connection mechanism outward from the vehicle in a substantially horizontal direction;
a vertical movement mechanism configured to move the first connection mechanism in a substantially vertical direction;
a tilt actuator; and
a second connection mechanism that couples the tilt actuator to one of the conveyance mechanism or the linkage, the second connection mechanism comprising a slot having a first end and a second end, wherein a portion of the tilt actuator is received and moveable between the first end and the second end of the slot.

* * * * *